United States Patent [19]

Salata

[15] 3,700,269
[45] Oct. 24, 1972

[54] SEXLESS HOSE COUPLING
[72] Inventor: Eugene A. Salata, College Park, Md.
[73] Assignee: The United States of America as represented by the Secretary of the Navy
[22] Filed: Nov. 17, 1970
[21] Appl. No.: 90,243

[52] U.S. Cl. .....................285/78, 285/360, 285/243
[51] Int. Cl. ................................................F16l 13/00
[58] Field of Search......285/78, 79, 73, 70, 360, 376, 285/243, 423, 74, 76; 287/103 A

[56] References Cited

UNITED STATES PATENTS

| 493,316 | 3/1893 | Townsend | 285/360 |
|---|---|---|---|
| 3,499,666 | 3/1970 | Turner | 285/55 |
| 641,846 | 1/1900 | Davenport et al. | 285/360 |
| 3,334,860 | 8/1967 | Bolton, Jr. | 285/423 X |
| 1,591,871 | 7/1926 | Heinrich | 285/360 X |
| 643,358 | 2/1900 | Konold | 285/360 X |
| 767,893 | 8/1904 | Jewell | 285/243 |
| 2,526,998 | 10/1950 | Davis | 287/103 A |
| 296,093 | 4/1884 | Wells | 285/73 |

Primary Examiner—Andrew V. Kundrat
Attorney—R. S. Sciascia, J. A. Cooke and R. J. Erickson

[57] ABSTRACT

A coupling for interconnecting lengths of flexible hose having identical half members including cooperating complimentary surfaces which upon abutting the halves together and twisting them in opposite directions cam the halves together into a tight fitting connection. Spring biased detent pins serve to permanently secure the halves in the coupled position when the adjacent ends of the connected hoses are compressed together.

4 Claims, 4 Drawing Figures

Patented Oct. 24, 1972

3,700,269

INVENTOR
Eugene A. Salata

BY  J. O. Tresansky

ATTORNEY

SEXLESS HOSE COUPLING

BACKGROUND OF THE INVENTION

This invention relates generally to sexless hose connectors and more particularly to a sexless coupling for a hose-type explosive charge.

Flexible type demolition charges recently have found a wide variety of uses in both commercial and military applications. These charges are usually composed of explosives such, for example, as Deta Sheet, 63 percent PETN (pentaerythritoltetranitrate) and 37 percent inert filler, formed in the shape of long hollow hoses which have a relatively great degree of flexibility. One of the applications of such charges is in clearing underwater obstacles. A swimmer may lay the hose on the floor of the body of water in such a manner that upon initiation of the explosive, either by the swimmer or by remote control, the obstacle will be completely demolished. Other applications, such as in swimmer carried weapons, have greatly increased the use of such demolition hose-type charges.

It is the usual practice for these charges to be manufactured in predetermined uniform lengths. Usually, these lengths are sufficient to make the use of only a single hose charge at any one time sufficient to complete a given task. In the past, though, it has frequently been found that a single length of hose charge has not been of sufficient length to complete a particular task. In these cases, two or more lengths of explosive hose demolition charges have been connected together at their ends to provide an adequate length for the task. Problems have arisen, however, with the apparatus employed to couple the lengths of hose and with the resulting coupling itself. In the past, cumbersome steel couplings were employed to connect lengths of hose charge together. The bulkiness and consequent great weight of these couplings made the handling of them by swimmers extremely difficult and inoperative couplings often resulted as a consequence. Besides being difficult to handle, the manufacture of the steel couplings entailed great expense. Further, it was not uncommon for sparking to occur due to the rubbing of the metallic coupling on rocks or debris during use. Occasionally, this inadvertent sparking would prematurely initiate the explosive charge often resulting in both an entirely wasted effort and an extremely hazardous condition for the swimmer. Finally the present day metallic couplings were always of the male-female type. This construction made it necessary to connect only the proper end of each length of hose to the appropriate end of the other length. Many hours have been spent in reversing the lie of a hose with respect to another after discovering that the wrong ends had inadvertently been lain adjacent each other.

SUMMARY OF THE INVENTION

Accordingly, one object of this invention is to provide a new and improved sexless hose coupling.

Another object of the invention is the provision of a new and improved sexless flexible hose connector.

Still another object of the present invention is to provide a new and improved coupling for operatively interconnecting lengths of hose-type explosive demolition charges.

A still further object of the present invention is the provision of a new and improved hose-type charge coupling which will not generate sparks.

Another still further object of the instant invention is the provision of light, inexpensive, easy to manufacture, hose-type demolition charge couplings.

Briefly, in accordance with one embodiment of this invention, these and other objects are attained by providing a coupling having identical half members composed of a non-metallic material. The half members are adapted such that upon their coupling they are drawn together thereby placing the end of one of the two lengths of hose in compressive abutting relationship with the other. A resiliently biased detent retains the coupling halves in position upon connecting the hose ends together.

BRIEF DESCRIPTION OF THE DRAWING

A more complete appreciation of the invention and many of the attendant advantages thereof will be readily appreciated as the same becomes better understood by reference to the following detailed description when considered in connection with the accompanying drawing wherein.

DESCRIPTION OF THE PREFERRED EMBODIMENT

Figure 1:
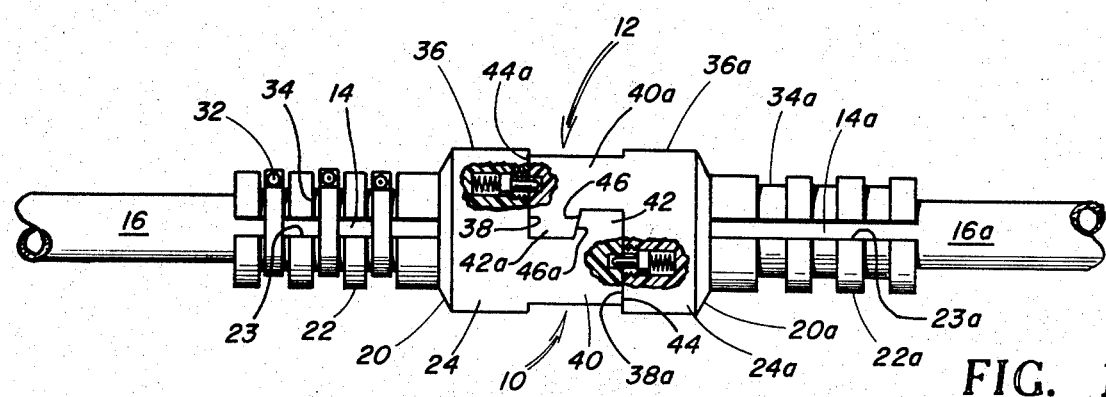
FIG. 1 is a side view, partly in section, of the coupling in the connected position.

Referring now to the drawings wherein like reference characters designate identical or corresponding parts throughout the several views, and more particularly to FIG. 1 thereof wherein the sexless explosive hose-type demolition charge coupling of the present invention is shown as including substantially identical halves 10 and 12 which are constructed of non-metallic material, such for example, as Lucite (a polymer of methyl methacrylate). For purposes of simplification similar reference numerals are used to designate similar parts in each of the coupling halves 10 and 12 with an *a* added to the reference numeral to indicate that it designates a part associated with the coupling half 12 and the numerals without the *a* to identify that a part associated with the coupling half 10. Each coupling half is fitted over an end portion 14 of a length of demolition hose charge 16 by means of a cylindrical bore 18 axially formed through each coupling half as will be described in greater detail hereinafter. The coupling halves 10 and 12 include a body 20 having a substantially cylindrical serrated collar portion 22 having at least one longitudinal slit 23 formed therein and an enlarged cylindrical mating portion 24 integrally connected at one end of the collar portion 22.

Figure 3:
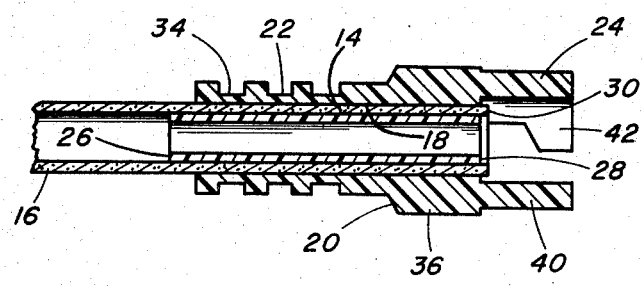
FIG. 3 is a sectional view of a coupling half fixed to an end of an explosive hose-type demolition charge.

Prior to positioning the serrated collar portion 22 over the respective end portion 14 of each length of hose charge 16, a rigid tubular mandrel 26 is fit within the hose end portion 14. (FIG. 3). The outer diameter of the mandrel 26 is slightly larger than the inner diameter of the hose charge 16 thereby providing an interference fit which enables the mandrel to be held in place by friction. The front edge 28 of the mandrel 26 is not flush with the front edge 30 of hose charge 16 but, rather, is recessed a small amount for reasons which will become clearer hereinafter. The serrated collar portion 22 of body 20 is then positioned over the end portion 14 and retaining members, such for example, as clamps 32 are placed in the parallel circumferential grooves 34 formed along the length of serrated collar portion 22. Upon tightening the clamps 32, the end portion 14 of hose 16 is compressed between the bore 18 and the mandrel 26 by virtue of the collar yielding around the longitudinal slit 23 under the pressure of the clamps. In this manner, the coupling halves 10 and 12 are securely affixed to their respective hose end portions 14 and 14a.

Figure 2:
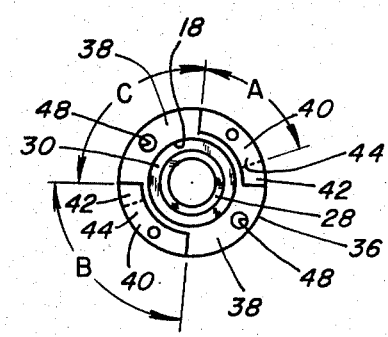
FIG. 2 is a front view of a coupling half.

The mating portion 24 of the coupling halves is substantially cylindrical and integrally formed with the collar portion 22 in a coaxial orientation with respect to bore 18. In the present embodiment the mating portion 24 includes an enlarged cylindrical portion 36 immediately adjacent to the collar portion 22 enclosing the terminal part of end portion 14. The enlarged cylindrical portion 36 is further defined by first substantially annular surfaces 38 formed perpendicular to the axis of the bore 18 and cooperating therewith to form a shoulder. It is shown that the front edge 30 of the hose charge extends slightly beyond first annular surfaces 38. Projecting from the first annular surfaces 38 in an axially parallel direction with respect to bore 18 are a pair of diametrically opposed arcuate wall segments 40 extending for a definite limited angle A, such for example, as 68° shown in FIG. 2. Each arcuate wall segment 40 has integrally formed at the end thereof an arcuate projection 42 defined by second substantially annular surfaces 44 forming, in addition, the ends of wall segments 40, and an outwardly beveled second side surface 46. The angle traversed by the second substantially annular surfaces 44 and denoted by angle B in FIG. 2 is limited in that it may not be 90° or more and in the present embodiment is 88°. The particular angle B chosen results in an angle denoted by C of greater than 90° (here 92°) which facilitates the coupling operation which will be more fully explained hereinafter.

Figure 4:
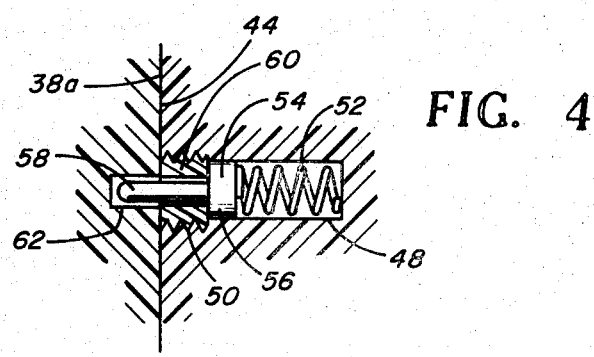
FIG. 4 is a detail sectional view of the detent device.

A device, a detail of which is shown in FIG. 4, for securing the coupling halves in their coupled position is included. A pair of diametrically opposed axial bores 48 are formed in the enlarged cylindrical portion 36 of the mating portion 24 and open into the first annular surfaces 38. The bores 48 are threaded at their outer portions 50 (FIG. 4) and function as the housing for a compression spring 52 and a pin member 54 in contact therewith. The pin member 54 includes a base portion 56 and an elongated portion 58, the pin member being normally biased outwardly by spring 52 but retained within bore 48 by an apertured threaded nut 60 which is positioned in the upper threaded portion 50 of bore 48. The elongated portion 58 of pin member 54 normally protrudes through the apertured nut with the pin member's base portion 56 being retained within the bore 48. Appropriately formed in the arcuate wall segments 40 and cooperating with the second substantially annular surfaces 44 are cylindrical cavities 62 which, upon coupling the halves 10 and 12 together, as will be described hereinafter, receive the end portion 58 of the pin member 54 thereby securing the coupling halves together.

In operation, the two halves 10 and 12 of the coupling are butted against one another such that their first substantially annular surfaces 38 abut the second substantially annular surfaces 44. Thus, angle B (here 88°) must of necessity be less than angle C (92°) in order to allow the aforementioned butting operation to be achieved. As this is done, the spring loaded pin members 54 are forced to retract into bores 48 by the action of the second substantially annular surfaces 44 against them. The coupling halves are twisted in opposite directions whereupon the beveled side surfaces 46 of the projections 42 on respective coupling halves communicate and act as camming surfaces butting the coupling halves tightly together. Bores 48 and cavities 62 are positioned so that when coupling halves are in this tightly connected position, the cavities 62 will align with the bores 48 thereby allowing the previously retracted elongated portion 58 of pin member 54 to move into the cavities 62 under the action of springs 52. This operation effectively and permanently locks the halves in their coupled position. Once the coupling position is achieved there is no reason to uncouple the connection and in view thereof the coupling halves 10 and 12 are designed such that it is impossible to unlock them after coupling is achieved.

It should now be apparent why the mandrel 26 is recessed internally of the edge 30 of the hose charge 16 and why the front edge 30 is positioned in front of the first substantially annular surfaces 38. Upon coupling, the front edge 30 of one hose charge 16 abuts the front edge 30a (not shown) of another hose charge 16a and are mutually compressed together. The amount of compression depends upon the length of hose charge projecting beyond annular surfaces 38 with at least a lower limit required depending upon the type of explosive being utilized since in order to transfer an explosive shock wave the two ends of the hose charge must be compressed a certain amount.

Obviously, numerous modifications and variations of the present invention are possible in light of the above teachings. For example, although the connector has been particularly described in connection with hose explosive charges, it is not so limited in the application and may be used to interconnect any flexible hose elements. It is therefore to be understood that within the scope of the appended claims the invention may be practiced otherwise than as specifically described herein.

What is claimed as new and desired to be secured by Letters Patent of the United States is:

1. A sexless coupling for interconnecting two lengths of hose comprising:

a pair of identically configured cylindrical members formed of a non-metallic material and having an axial bore therethrough;

a pair of tubular members individually insertable into an end portion of each of said lengths of hose wherein the front edge of each of said tubular members is recessed rearwardly of the front edge of said end portion of said lengths of hose;

means formed on one end of said cylindrical members for receiving said end portions of each of said lengths of hose in a manner wherein said front edge of said tubular members does not project beyond the other end of said cylindrical members, and said front edge of said end portion of said lengths of hose projects beyond said other end of said cylindrical members;

a pair of diametrically opposed cylindrical segments projecting from a portion of said other end of each of said cylindrical members, each of said segments having an end portion of a particular peripheral dimension and an intermediate portion of a reduced peripheral dimension, the segments of one cylindrical member being conformingly engagable by the segments of the other cylindrical member upon rotation of said cylindrical members when engaged; and detent means for effecting locking of said cylindrical members and contact between said front edges of said receiving end portion upon engagement and rotation of said cylindrical members, including;

at least one bore formed within said other end of each of said cylindrical members housing a resiliently urged elongate pin member and a least one bore formed within said end portion of said diametrically opposed segments receivable of said pin member.

2. A sexless coupling as recited in claim 1 wherein each of said pair of diametrically opposed cylindrical segments is defined by a cross section of an arcuate configuration of less than 90°.

3. A sexless coupling as recited in claim 2 wherein said cylindrical segments are further defined by an outwardly tapered surface cooperating with said particular peripheral surface and said reduced peripheral surface such that, upon engagement, said cylindrical members are cammed together and the forward edges of said hoses are compressed into contact thereby resulting in an operable connection.

4. A sexless coupling for interconnecting two lengths of hose as recited in claim 1 wherein said hose end portion receiving means comprises a serrated cylindrical collar connected to said cylindrical members having at least one longitudinal slit formed therein and a clamp seated within each of the serrations of said cylindrical collar cooperating with said tubular member inserted within the received end portion to firmly grip said received end portion.

* * * * *